July 2, 1957  C. B. WALLDOW  2,797,724
SELECTIVE MULTIPLE CONTROL MECHANISM FOR MACHINE TOOLS
Filed May 6, 1952  4 Sheets-Sheet 3
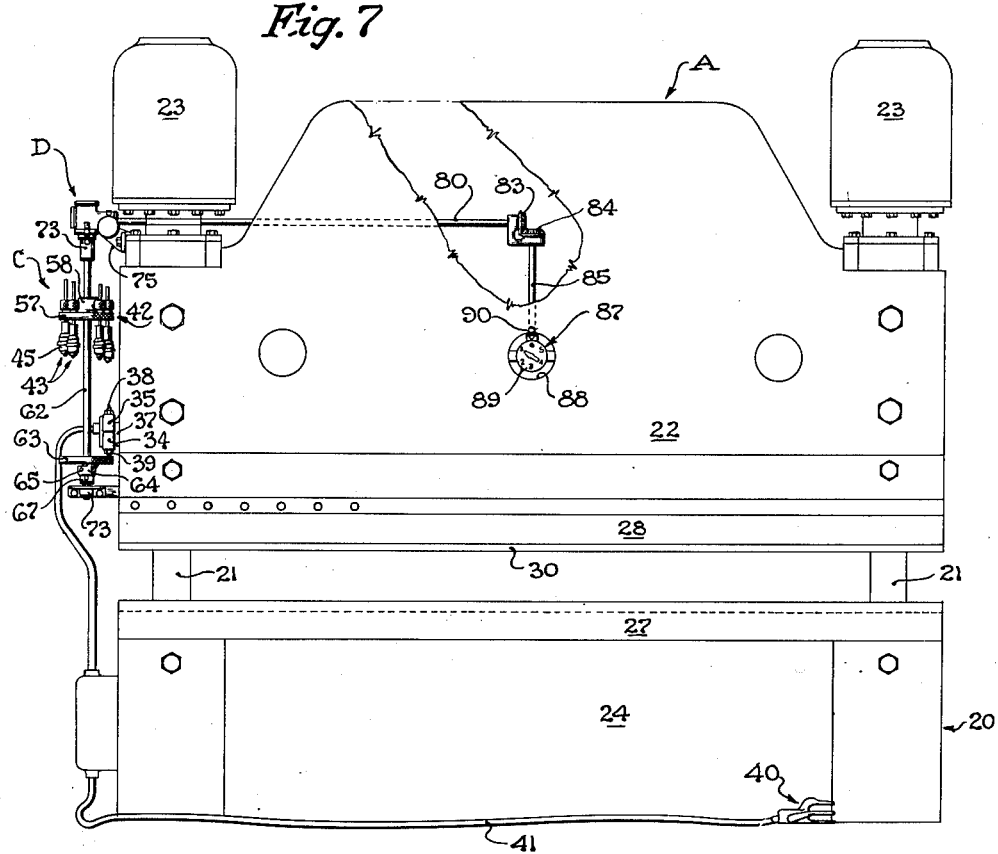
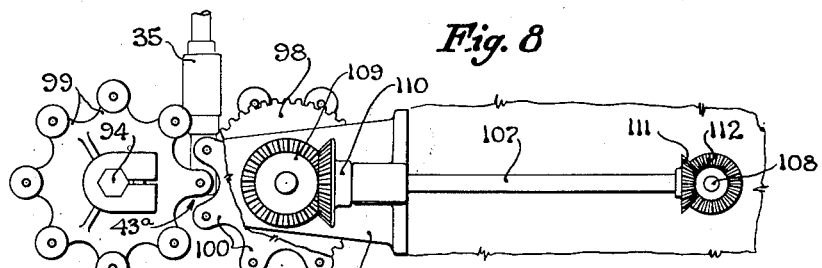
INVENTOR.
CARL B. WALLDOW
BY
Hansen & Lane
HIS ATTORNEYS July 2, 1957  C. B. WALLDOW  2,797,724
SELECTIVE MULTIPLE CONTROL MECHANISM FOR MACHINE TOOLS
Filed May 6, 1952  4 Sheets-Sheet 4

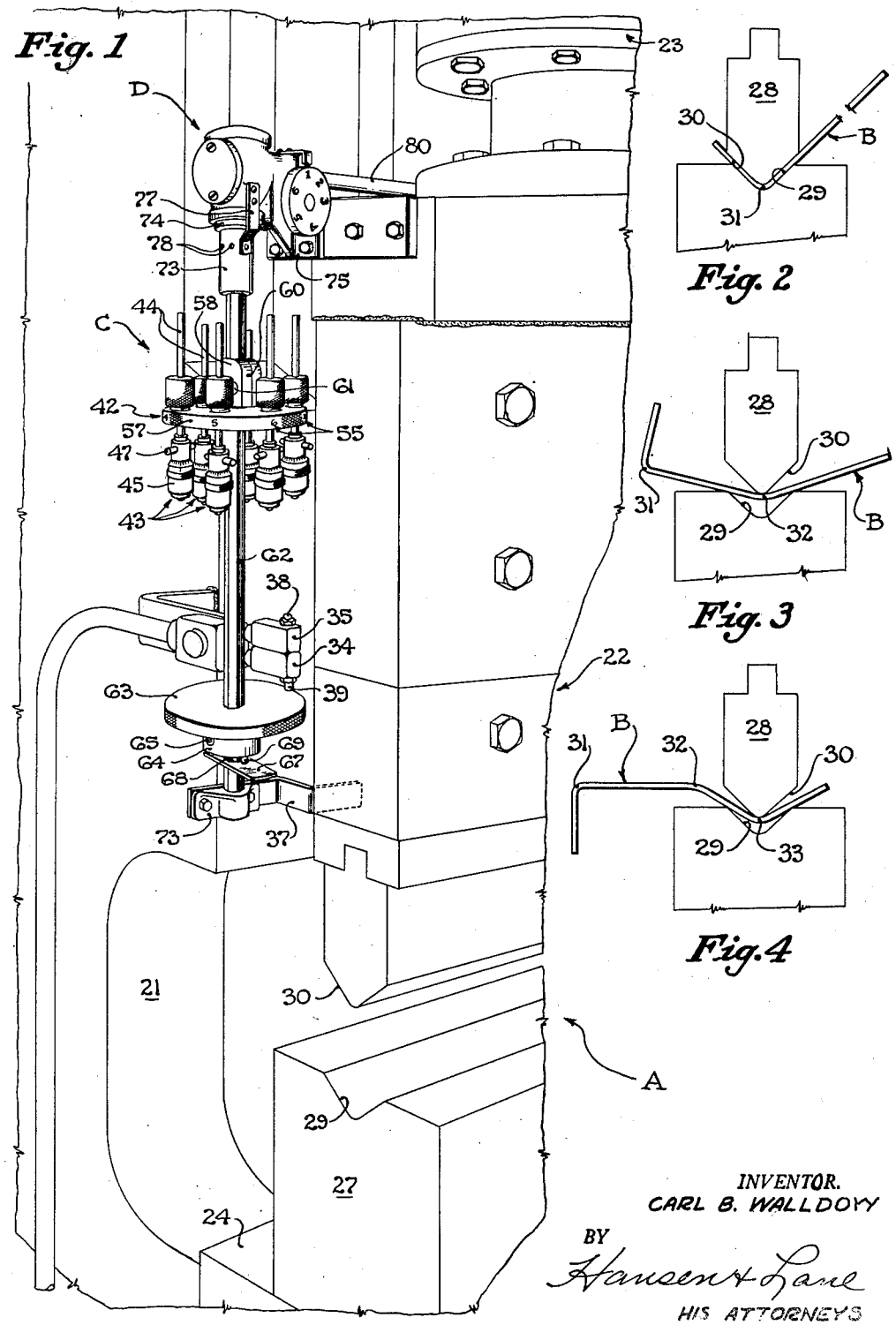

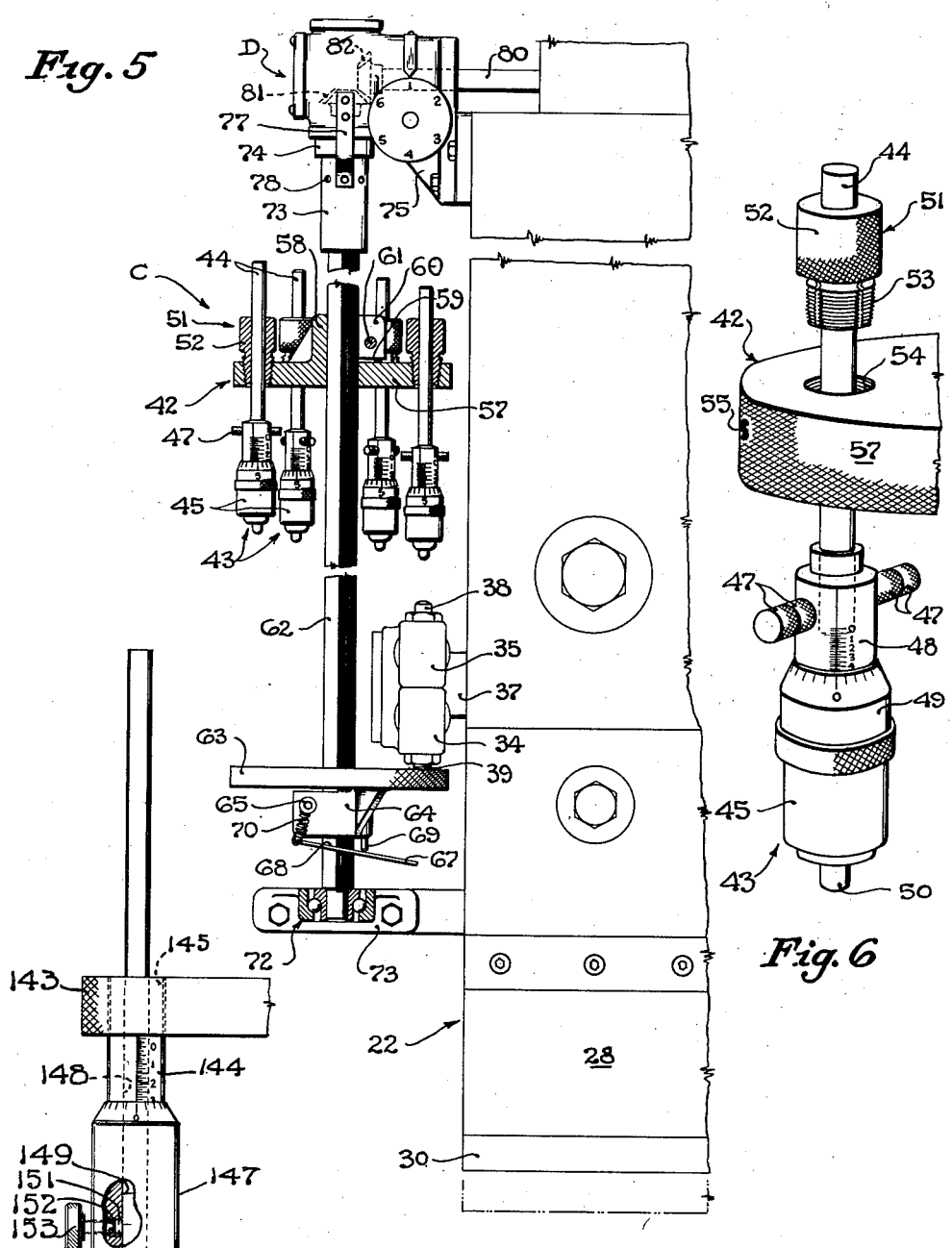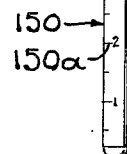

INVENTOR.
CARL B. WALLDOW
BY
Hansen & Lane
HIS ATTORNEYS.

United States Patent Office 2,797,724
Patented July 2, 1957

2,797,724

SELECTIVE MULTIPLE CONTROL MECHANISM FOR MACHINE TOOLS

Carl B. Walldow, Campbell, Calif.

Application May 6, 1952, Serial No. 286,401

7 Claims. (Cl. 153—21)

The present invention relates to control mechanism, and pertains particularly to multiple control mechanism for selectively controlling the stroke length of the rams or tool holders of hydraulic press brakes and similar machines.

In hydraulic presses and press brakes of various types now widely used in the fabricating of sheet metal, different degrees of bend can be produced in a work piece by changing the stroke length of the ram of the press. This variation in bend ranges from a very slight bend, produced by arresting the ram of the press a slight distance beyond its initial engagement with the work piece being fabricated; to the full limit of bend which the dies installed in the press are capable of performing. The latter occurs, of course, at the end of a full, bottoming stroke of the ram.

In the past, it has been common practice in the operation of press brakes and similar mechanisms either to re-adjust the press for a different stroke length upon the completion of all operations on a work piece requiring a predetermined stroke length; or to set the press for a desired stroke length for performing one operation, and then to perform such operation upon a predetermined number of work pieces, known as a "run." In the latter case, it is necessary to re-adjust the stroke length of the press ram after each operation has been performed on the run of work pieces. With the performance of each successive operation, the work pieces obviously will assume a more complicated, and usually a bulkier, character. This necessarily limits the number of work pieces which can conveniently be assigned to a run, and requires frequent readjustment of the press, with consequent substantial loss of operating time.

While the present invention is herein illustrated and described as being embodied in a press brake, those familiar with the art will understand that the invention also is capable of being used on other types of machines which are subject to control in a similar manner so as to perform successive operations requiring different stroke lengths. Examples of such other types of machines are turret lathes and drill presses.

The invention contemplates the provision of a device on a machine for selectively controlling the stroke lengths of a machine tool element for performing successive different operations on a work piece mounted on the machine.

It is also an object of the invention to provide adjustable means for accurately controlling selected stroke lengths of a machine tool mounted for operation on a work piece, whereby the adjustable means may be readily and quickly positioned in any of a plurality of selected positions.

It is a further object of the invention to mount a plurality of stroke control devices upon an adjustable support whereby selected stroke control devices may be moved into and out of controlling position with respect to a mechanism to be controlled.

It is an additional object of the invention to provide an improved turret type micrometer control mechanism for use on hydraulic press brakes and similarly controlled mechanisms.

The foregoing and other objects and advantages of the invention will be apparent from the following description and the accompanying drawings, wherein:

Fig. 1 is a fragmentary elevational view of an end portion of a hydraulic press brake with multiple stroke length control mechanism embodying the present invention mounted thereon.

Figs. 2, 3 and 4 are diagrammatic views, in the nature of end elevations, of a pair of bending dies performing successive operations on a work piece, each of said successive operations requiring a different stroke length.

Fig. 5 is a vertical transverse sectional view through the control mechanism shown in Fig. 1.

Fig. 6 is an enlarged fragmentary elevational view showing the mounting arrangement for one of the micrometers.

Fig. 7 is a front elevational view in reduced scale of the press brake and control mechanism shown in Figs. 1 and 5.

Fig. 8 is an enlarged fragmentary horizontal sectional view taken as along line 8—8 of Fig. 5, but showing a modified form of control shaft operating mechanism with a pair of interdigitated micrometer support turrets.

Fig. 9 is a side elevational view of the portion of the mechanism shown in Fig. 8.

Fig. 13 is a fragmentary side elevational view of a modified form of micrometer and metered extension rod and mounting therefor, a portion of the micrometer nut being broken away to show the clamping arrangement.

Figures 10, 11, 12:
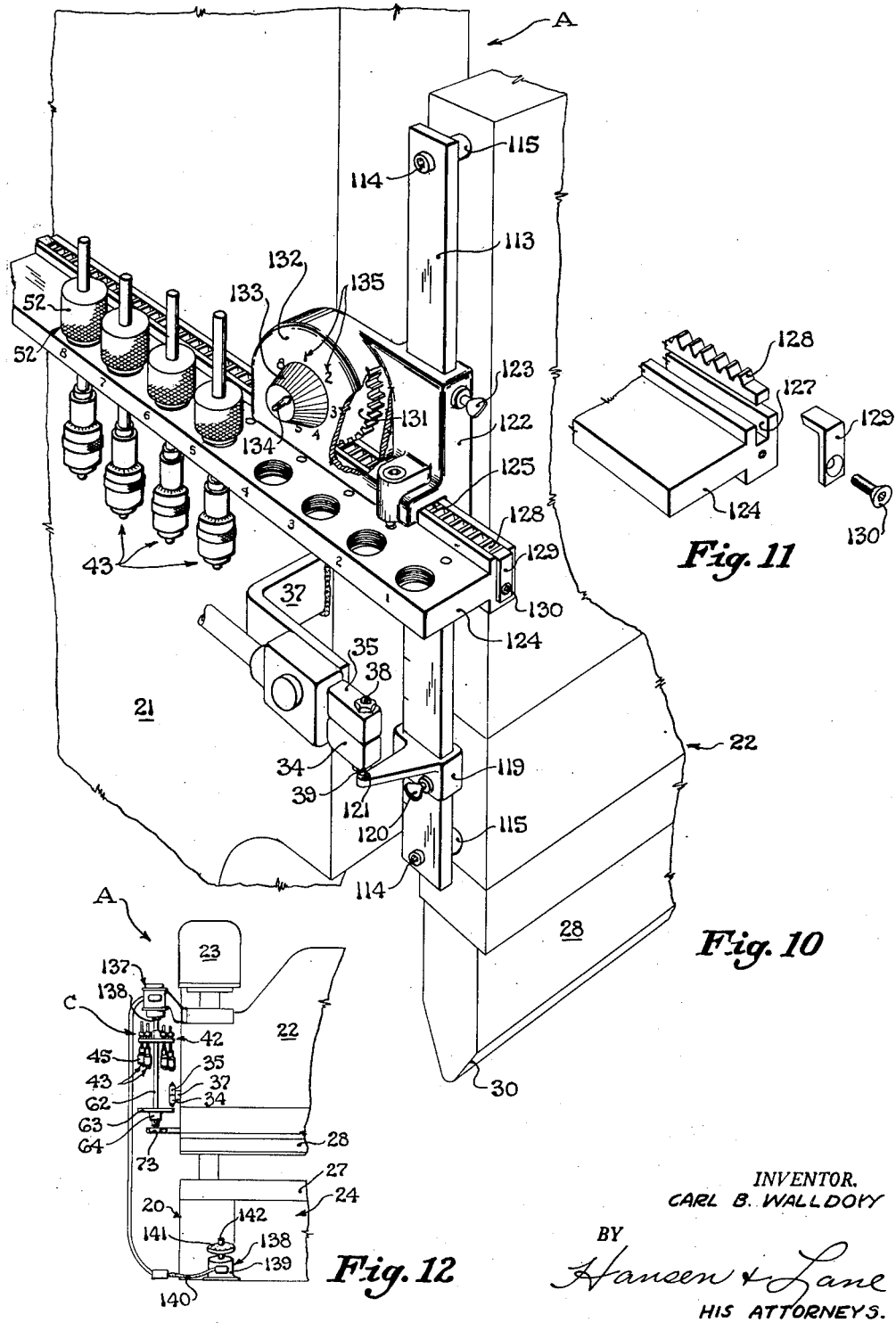
Fig. 10 is an enlarged fragmentary perspective view of a further modified form of the invention.
Fig. 11 is a further enlarged fragmentary view of a detail of the structure shown in Fig. 10.
Fig. 12 is a fragmentary front elevational view in reduced scale of the left hand portion of a press brake and stroke control mechanism generally similar to that shown in Figs. 1 and 5, but with a modified form of turret actuating mechanism associated therewith.

Referring first to the embodiment of the invention shown in Figs. 1 and 5 to 7 inclusive, a press brake A is of a well-known welded frame type comprising an upright base plate 20, upright, ram-supporting end plates 21, 21, a ram 22, and hydraulic ram actuating cylinders 23, 23. A usual bed plate 24 is fixedly mounted on the base plate 20 to be positioned directly below the ram 22. A lower die 27 and upper die 28 are adapted to be releasably attached to the bed plate 24 and ram 22, respectively. As illustrated, the dies mounted on the press brake A are simple 90° bending dies, with a groove 29 of V-shaped 90° cross sectional shape extending lengthwise of the lower die, closely to receive the correspondingly shaped lower edge 30 of the upper die 28. With the dies mounted in the press brake A as illustrated, the distance the ram 22 travels downwardly after the upper die 28 first engages a sheet metal work piece B positioned to extend across the groove 29 in the lower die 27 determines the amount of bend which will be imparted to the work piece.

The work piece B illustrated in Figs. 2, 3 and 4 is shown as being subjected to three successive bending or braking actions, each requiring a different stroke of the ram. In Fig. 2 the upper die 28 is fully bottomed in the groove 30 of the lower die 27, thereby braking the work piece at 31 to the full limit of bend of which the dies are capable. In Fig. 3, a very slight bend is being imparted to the work piece B at 32, while in Fig. 4 the work piece B has been turned over and a reverse bend is being imparted to it at 33.

In order to provide for accurately controlling the length of successive strokes of the ram 22 so as to be able to make successive bends of different predetermined angles in each work piece of a run thereof, a selective control mechanism indicated generally by the letter C is mounted at a side of the press so as to be out of the way of work pieces fed to the press. A pair of vertically superposed sensitive switches 34 and 35 are mounted on a bracket 37, which in turn is rigidly secured to one of the press end plates 21. The upper switch 35 is provided with an upwardly directed push button 38, while the lower switch 34 has a downwardly directed push button 39 incorporated therein. The switches 34 and 35 are of a well-known type, wherein the contacting mechanism, not shown, is actuated by an exact predetermined movement of the push button 38 or 39 respectively associated therewith. Each of the switches 34 and 35 is connected by usual conductors, not shown, to conventional relays which in turn control the usual hydraulic valves for reversing the direction of ram movement.

Actuation of the upper switch 35 reverses the direction of ram movement from downward to upward, while actuation of the lower switch 34 reverses the direction of ram movement from upward to downward. A usual foot controlled main switch 40 is connected, by means of a flexible conductor cable 41, to control the admission of hydraulic fluid under pressure to the cylinders 23, 23 through the hydraulic valves not shown, which in turn are controlled by the switches 34 and 35.

It is common practice to control upward and downward movements of the ram of a press brake and other similarly controlled mechanisms by electric control circuits of the general type shown. The details of these conventional electrical and hydraulic circuits, therefore, are omitted, since they comprise no part of the present invention.

The control mechanism C for selectively actuating the switch push buttons 38 and 39 comprises a rotatively mounted turret disk 42 having a plurality of selectively adjustable micrometer assemblies 43 mounted thereon.

Each micrometer assembly 43 comprises a rod portion 44 having a well known type of micrometer head 45 secured to the lower end thereof by knurled set screws 47, 47. Each micrometer head 45 comprises an axially indexed stationary screw portion 48, a relatively rotatable, circumferentially indexed nut portion 49, and a usual anvil 50 carried by the rotatable and axially adjustable nut portion 49. The rod portion 44 of each micrometer assembly 43 is inserted with a normally free slidable fit in the axial bore of a collet nut 51, which has a knurled cylindrical head portion 52, and a longitudinally divided, tapered, threaded portion 53. The divided, threaded portion 53 is adapted to be screwed into a correspondingly tapered, threaded hole 54 (Figs. 5 and 6) in the turret disk 42. Index numbers 55 are provided adjacent each of the micrometer supporting collet nuts 51 to facilitate identifying the micrometers therein. By screwing a collet nut 51 tightly into its hole, the divided threaded portion 53 thereof is clamped against the rod portion 44 of the micrometer assembly 43 therein to secure the micrometer in axially adjusted position in the turret disk 42.

The turret disk 42 comprises a disk portion 57 and an integral hub portion 58. The periphery of the disk portion 57 is knurled so that it may be grasped for turning the disk to a desired position of adjustment. The hub portion 58 is partially severed from the disk portion 47 by a cut 49 (Fig. 5) and the portion of the hub severed by this cut is split lengthwise by a cut 60 along a radial plane through the hub axis. A usual clamp screw 61 is adapted to draw together the two sides of the hub 58 on opposite sides of the radial cut 60 therein to clamp the turret disk 42 in axially adjusted position on a hexagonal support rod 62 upon which the turret disk is mounted.

A second disk member 63, for limiting the upward stroke of the press ram 22 is mounted below the turret disk 40 for adjustment axially of the support rod 62. The lower disk member 63 is generally similar to the turret disk 42 with the exception that it is without micrometer mounting holes and is mounted in inverted position relatively to the turret disk 42.

The lower disk 63 has a partially severed split hub 64 similar to the hub 58 of the turret disk 42, and is provided with a clamp screw 65 whereby the lower disk 63 may be clamped in axially adjusted position to the support rod 62. For facilitating axial adjustment of the lower disk 63 a tilting clamp plate 67 is mounted on the lower end of the lower disk hub portion 64. The clamp plate 67 has a hole 68 therein of a size to receive the hexagonal support rod 62 freely therein, and to permit the clamp plate 67 to be tilted at a sufficient angle, relatively to the axis of the support rod 62, so that the edges of the clamp plate 67 surrounding the hole 68 therein will bite into the support rod 62 and resist downward movement of the lower disk 63 along the support rod 62. A fulcrum post 69 is mounted to extend downwardly below the lower end of the lower disk hub portion 64, and a coil spring 70 is connected in tension between the clamp screw 65 and the end of the clamp plate 67 on the opposite side of the hub 64 from the fulcrum post 69.

Normally the coil spring 70 will tilt the clamp plate 67 about the lower end of the post 69 as a fulcrum causing the clamp plate 67 to grip the support rod 62 and prevent downward movement of the clamp plate 67 and the lower disk 63 supported thereon. By manually gripping the extending end portion 71 of the clamp plate 67 on the opposite side of the support post 62 from the coil spring 70, however, the plate 67 can be swung to lie in a plane substantially normal to the axis of the support rod 62. This action releases the clamp plate 67 from gripping engagement with the support rod 62 and thereby frees the lower disk 63 for axial movement along the support rod 62, providing the clamp screw 65 also is released at such time.

The lower end of the hexagonal support rod 62 is mounted in the inner race of a ball bearing 72 supported in a bracket 73 on the press ram 22. The upper end of the support rod 62 is fitted into a sleeve 73 which in turn is mounted in the inner race of a ball bearing 74 mounted in a bracket 75, also mounted on the press ram. Thus the turret disk 42 and the lower disk 63 are both mounted for axial adjustment on the support rod 62, which in turn is rotatively supported on the ram 22 with the axis of the support rod extending in the direction of ram movement.

A spring pressed detent member 77 is mounted on the upper bracket 75 and is adapted to enter depressions 78 provided in the sleeve 73 adjacent each micrometer receiving station of the turret disk 42. The detent thus releasably retains the turret disk in rotatively adjusted position, with a selected micrometer 43 in alignment with the upper push button 38.

To facilitate adjusting the rotative position of the support rod 62 and the disks 42 and 63 thereon in order to bring a selected micrometer into alignment with the upper push button 38, a remote control mechanism D is provided. The remote control mechanism comprises a control shaft 80 journaled to extend transversely across the rear face of the press ram 22. Meshed bevel gears 81 and 82 provide driving connection between the control shaft 80 and the support rod 62. Additional bevel gears 83 and 84 provide driving connection betweeen the transversely mounted control shaft 80 and a short shaft 85 journaled in axially upright position on the rear of the ram 22.

A control knob 87 is flush mounted in a hole 88 in the press ram 22 and has driving connection with the short upright shaft 85 by means of usual meshed bevel gears, not shown. The control knob 87 is spaced inwardly from the edge surrounding the hole 88 to leave a slight marginal opening around the knob 87 so that men working on one side of the ram 22 may look through the opening and observe anyone who may be working on the other side of the ram. Additional remote control stations, not shown, may be provided as required.

The control knob 87 is provided with index numbers 89 corresponding to the index numbers 55 on the turret disk 42, and is adapted to be adjusted so that when a pointer 90, mounted on the ram 22 adjacent thereto, points to any of these numbers, the correspondingly numbered micrometer 43 will be aligned with the upper push button 38.

To perform the three successive braking operations illustrated in Figs. 2, 3 and 4, the clamp screw 61 in the hub of the upper or turret disk 42 is loosened, and the turret disk 42 is moved axially along the support rod 62 to a position which will allow a required adjustment of the individual micrometers. This location of the turret disk can readily be judged by visual observation on the part of an experienced press operator or set-up man.

Next, the three micrometers 43 to be employed for making the three bends illustrated in Figs. 2, 3 and 4 are selected, for example, those designated by the index numbers 1, 2 and 3. Each of the three selected micrometers then is adjusted so that it will engage the upper push button 38 and operate the upper switch 35 and reverse the direction of ram travel from down to up when the ram has reached a desired bottom of its required stroke.

Initial or preliminary adjustment of each micrometer is accomplished by loosening the collet nut 51 in which it is mounted to free the micrometer, and then slidably moving the micrometer support rod 44 axially through the loosened collet nut to a desired position of adjustment. The collet nut then is retightened to grip the rod and retain it in adjusted position.

Final adjustment is of course accomplished by rotatively moving the nut portion 49 of the micrometer as required.

The upper limit of all strokes of the ram 22, regardless of the individual settings of the micrometers 43, is controlled by the height of the lower disk 63 on the support rod 62. The lower disk 63 may be moved to a desired position of adjustment on the rod 63 by loosening the clamp screw 65 and tilting the clamp plate 67 about the lower end of the fulcrum post 69 as a fulcrum to free the edges of the clamp plate around the hole 68 from their biting engagement with the support rod 62. After moving the lower disk 63 up or down along the support rod 62 as required to a desired position of adjustment, the lower disk 63 will be retained in such adjusted position upon release of the clamp plate 67 to free the clamp plate for tilting movement under the tension of the coil spring 70 into biting engagement with the support rod 62. The lower disk 63 may be more firmly secured in adjusted position by tightening the clamp screw 65.

With the three micrometers identified by index numbers 1, 2 and 3 adjusted to control the down limit of the ram stroke to perform, selectively, the three bending operations illustrated in Figs. 2, 3 and 4, the disk support shaft 62 is turned to a desired indexed position for each bending operation, as required. Such turning movement may be accomplished either by direct manipulation of the turret disk 42, or by means of the remote control knob 87 and associated mechanism as desired.

In the event that it should become necessary, during the fabrication of a run of work pieces requiring the operation shown in Figs. 2, 3 and 4, to interrupt the work in order to fabricate a second run of work pieces requiring up to three press operations of different stroke lengths than those for which the micrometers numbered 1, 2 and 3 are adjusted, the three remaining micrometers 4, 5 and 6 may be used for controlling the stroke lengths for performing the operations on the work pieces of the second run. The first three micrometers thus could be permitted to remain in their adjusted positions, so that upon completion of the second run of work pieces requiring the operations controlled by the micrometers 4, 5 and 6, work could be resumed on the first mentioned work pieces without requiring readjustment of the micrometers.

In some types of work, such as the fabrication of airframe structures for aircraft, it frequently is necessary to make a relatively large number of bends in a work piece, with each bend requiring a different stroke length. Also, at times, frequent adjustments are necessary in the forming of bends in material of varying thickness. In such work, interruptions to produce different parts which may be required in an emergency are sometimes frequent. In order therefore to provide a control mechanism having a large number of micrometers to take care of such contingencies, a modified interdigitated double turret arrangement shown in Figs. 8 and 9 is provided. This arrangement permits the number of available micrometers to be increased materially without requiring the use of a large and unwieldy turret disk for their accommodation.

In the modified micrometer support arrangement shown in Figs. 8 and 9, a pair of turret members 92 and 93 are mounted on parallel upright support shafts 94 and 95 journaled in an upper bracket 96 secured to the press ram 22, and in a generally similar lower bracket, not shown, also secured to the ram 22.

The support shafts 94 and 95 are each provided with meshed gears 97 and 98 on their upper ends, so that a rotative movement of one shaft will produce a similar, but reverse, rotative movement of the other.

Each of the two turret members 92 and 93 is provided with angularly spaced radial extensions 99 and 100 respectively. The radial extensions of each of the turret members are adapted to fit freely, in interdigitated relation, into the spaces between the radial extensions of the other, and the cylindrical surfaces of rotation defined by the axes of the micrometers of the two turrets 92 and 93 are tangent to each other along a line in a plane defined by the axes of the support shafts 92 and 93. Such line of tangency is directed toward the upper push button, not shown, which may be similar to the push button 38 mentioned previously herein. Thus, upon a rotative movement of the meshed gears 97 and 98 and their respective supporting shafts 94 and 95, the micrometers supported in the radial extensions 99 and 100 will be moved in alternate succession into the position occupied by the micrometer 43a in Figs. 8 and 9, with its axis disposed on a line midway between the axes of the shafts 94 and 95, and parallel thereto. In this position, as mentioned previously herein, the micrometer is aligned with the push button of the upper switch, not shown.

The micrometer supporting radial extensions 99 and 100 in the two turrets 92 and 93 may be provided with index numbers (not shown) in the manner described for those shown for example in Fig. 1, odd numbers preferably being employed to designate the micrometers on one turret, and even numbers to designate those on the other.

A spring-pressed ball type detent 103 (Figs. 8 and 9) of a well-known type may be employed to engage recesses 104 provided therefor in the upper face of the gear 97, releasably to retain the turrets 92 and 93 in adjusted position.

For controlling the upper limit of movement of the ram 22 a lower disk, not shown, similar to the lower disk 63 (Figs. 1, 5 and 7) described previously herein, may be mounted on either of the shafts 94 or 95, the lower disk being of sufficiently large diameter to engage a lower push button, not shown, similar to the lower push button 39.

Remote control mechanism similar to that described previously herein, and comprising shafts 107 and 108 and bevel gears 109 and 110, and 111 and 112 may be provided for controlling the rotative interdigitated turret members 92 and 93 from stations at desired points along the press brake upon which the control device is mounted.

A further modified control mechanism is shown in Fig. 10. In this latter modification a vertical support bar 113 is mounted by cap screws 114, 114 on an end of the press brake ram 22 and is spaced therefrom by spacing collars 115, 115.

A pair of relatively superposed switches 34 and 35, similar to those described previously herein is rigidly secured to the end plate 21 of the press brake A.

An upper limit stop member comprises bracket 119 mounted for slidable movement lengthwise of the support bar 113. A set screw 120 is mounted to secure the bracket 119 in adjusted position on the bar 113. The bracket 119 has an anvil 121 mounted thereon in position to engage the downwardly directed push button 39 of the lower switch 34 upon a predetermined upward limit of ram movement.

A micrometer support bracket 122 also is mounted for vertical slidable movement on the support bar 113, and is provided with a clamp screw 123 to secure the bracket in adjusted position on the bar 113. A micrometer mounting bar 124 of T cross-sectional shape is mounted with the head of the T thereof fitted for transverse slidable movement into an undercut channel 125 provided therefor on the outer side of the micrometer support bracket 122. A plurality of micrometer assemblies 43, 43 similar to the micrometer assemblies 43 shown in Figs. 1, 5, 6 and 7 are mounted for vertical axial adjustment in collet nuts 51 screwed into a plurality of equally spaced taper, threaded holes aligned lengthwise of the T-bar 124.

A groove 127 is provided in the upper edge of the head portion of the T-bar 124, and a rack bar 128 is fitted therein. The rack bar 128 is secured in position in the groove 127 by end clips 129 and screws 130.

An adjusting gear 131 is journaled in a gear housing 132 formed integrally with the micrometer supporting bracket 122. The gear 131 is in mesh with the rack 128, and is of a diameter to cause a complete traversing movement of the micrometer supporting T-bar 124 upon one revolution of the gear 131. A control knob 133 is mounted to rotate the gear 131, and is provided with a pointer 134 which is adapted to point to selected index numbers 135 on the gear housing 132 to indicate the alignment of a selected micrometer 43a with the upper push button 38. The operation of the modifications shown in Figs. 8, 9, 10 and 11 will be obvious from an understanding of the operation of the mechanism illustrated in Figs. 1, 5 and 7 and described previously herein.

A modified form of remote control mechanism is shown in Fig. 12. The micrometer support mechanism may be, for example, of the type shown in Figs. 1, 5 and 7, with a turret disk 42 and upper limit stop disk 63 mounted on the rotatable support rod 62. A motor unit 137 of a self-synchronizing motor-generator set is mounted with its shaft 138 secured to rotate with the turret support rod 62. Such self-synchronizing motor-generator sets are commonly employed for producing synchronous movements between the shaft of a generator unit and the shaft of a remotely mounted, electrically connected motor unit. Such sets are known to those familiar with the art as selsyn devices.

The generator unit 138 of the selsyn apparatus is mounted on a movable floor base 139, and is connected by a conventional flexible conductor cable 140 to the selsyn motor unit 137. A selector dial 141, bearing index numbers corresponding to those of the turret disk 42 is adapted to be moved rotatively to align a selected index number with a pointer 142, so that an operator, by turning the dial to adjusted position with his foot, can align selected micrometers on the turret 42 with the push button of the upper ram control switch 35.

A modified form of micrometer and extension rod therefor is shown in Fig. 13. There a suitable micrometer support 143, has the screw portion 144 of a micrometer mounted with its upper end 145, shown in dotted lines, in Fig. 13, inserted with a press fit in a hole provided therefor in the support 143. The micrometer nut portion 147 is screwed onto the micrometer screw portion 144 for axial adjustment in a usual manner. Both the micrometer screw portion 144 and nut portion 147 have aligned axial bores 148 and 149 therethrough slidably to receive an extension rod 150 for axial slidable movement therein. The rod 150 is marked off in measured increments 150a from its lower end, to facilitate rapid adjustment closely to a desired setting. For clamping the rod 150 in adjusted position a clamp block 151 of brass is mounted for radial slidable movement in a recess 152 provided therefor adjacent the bore of the micrometer nut member 147. A thumb screw 153 is adapted to press the block 151 into clamping engagement with the rod 150 to hold it in axially adjusted position in the micrometer nut portion 147. This arrangement is particularly desirable in cases where frequent resetting of the control is desired since the combination scale thus provided gives the set-up man the benefit of being able rapidly to set the rod 150 to approximately correct position by means of the rod scale 150a, and then to make final adjustment by means of the micrometer nut 147.

While I have illustrated and described a preferred embodiment of my invention and some modifications thereof, it will be understood that various changes may be made in the details thereof without departing from the spirit and scope of the invention as set forth in the appended claims.

Having thus described the invention, what I claim as new, and desire to protect by Letters Patent is defined in the following claims.

1. A control mechanism for a machine having a hydraulically actuated tool holder mounted to move back and forth along a predetermined path, means for selectively actuating said tool holder in each of two opposite directions along said path, a pair of reversing elements fixedly mounted adjacent said path to face in opposite directions, a micrometer support member adjustably movable transversely of said path, means for retaining said support in each of a plurality of transversely adjusted positions, means mounting said support member on said tool holder for movement therewith along said path, a plurality of micrometers mounted in said support and adapted to align selectively with one of said reversing elements in each of a plurality of transversely adjusted positions of said support, each of said micrometers being adjustable selectively to engage one of said reversing elements at an accurately adjusted point in a stroke of said tool holder along said path, and a member mounted on said tool holder on the opposite side of said reversing elements from said micrometer support and adjustably attached to the micrometer support for mounting therewith, said oppositely mounted member being positioned to engage the other of said reversing elements at an adjusted point in a return stroke of said tool holder along said path.

2. A control mechanism for a press having a hydraulically actuated tool holder mounted to move back and forth along a predetermined path, drive means for selectively moving said tool holder in each of two opposite directions along said path, a pair of reversing elements fixedly mounted adjacent said path, and operatively connected to said drive means to reverse the direction of movement of said tool holder in opposite directions upon actuation of each of said reversing elements, a micrometer support adjustably movable transversely of said path, means for retaining said support in each of a plurality of transversely adjusted positions, means for adjusting said support lengthwise of said path, means mounting said support on said tool holder for movement therewith along said path, and a plurality of micrometers mounted for individual adjustment in said support, said micrometers being mounted for selective alignment with one of said reversing elements in each of a plurality of transversely adjusted positions of said support, each of said micrometers being adjustable relative to said support to engage one of said reversing elements, when aligned therewith, at an accurately adjusted point in a stroke of said tool holder along said path.

3. A control device for a machine tool having a hydraulically actuated tool holder mounted to move back and forth along a predetermined path, a pair of reversing elements mounted, upon actuation of each thereof, to reverse the direction of tool holder movement in opposite directions, said control device comprising a transversely extending track mounted on said tool holder for movement therewith, a micrometer supporting member mounted on said track, means for adjusting said support lengthwise of said track, a plurality of micrometer support rods mounted in laterally spaced relation on said micrometer supporting member and positioned to be directed selectively toward one of said reversing elements in each of a plurality of adjusted positions of said support on said track, releasable means securing each of said rods in axially adjusted position on said support, a micrometer mounted on each rod beyond said support for micrometer adjustment axially of its rod, and means carried by said tool holder and positioned to engage the other reversing element upon a predetermined movement of said tool holder in the opposite direction.

4. An arrangement according to claim 3 wherein said track is adjustable in a direction lengthwise of said path.

5. A control mechanism for a machine having a fixed frame and a tool holder mounted thereon to move back and forth along a predetermined path, a pair of control switches mounted with the actuating elements thereof facing oppositely adjacent said path and fixedly secured to said frame, said switches being connected, upon actuation of each thereof, to reverse tool holder movement in opposite directions, a control support rod mounted on said tool support for movement therewith, means for rotatively adjusting said control support rod to a plurality of predetermined angular positions about its longitudinal axis, a micrometer support head mounted on said support rod for adjustment axially of said rod, means for securing said micrometer support head in selected adjusted position on said support rod, a plurality of micrometer support rods mounted on said head in positions corresponding to the angularly adjusted positions of said control support rod to project from the micrometer support head lengthwise of the tool path for selective alignment with the actuating element of one of said switches in each of the selected angularly adjusted positions of said control support rod, a micrometer mounted on each micrometer support rod axially beyond said micrometer support head toward said switches for micrometer adjustment of the overall length of the rod and the micrometer mounted thereon.

6. A control mechanism for a machine having a fixed frame and a tool holder mounted thereon to move back and forth along a predetermined path, a pair of control switches mounted with the actuating elements thereof facing oppositely adjacent said path and fixedly secured to said frame, said switches being connected, upon actuation of each thereof, to reverse tool holder movement in opposite directions, a control support rod mounted on said tool support for movement therewith, means for rotatively adjusting said control support rod to a plurality of predetermined angular positions about its longitudinal axis, a micrometer support head mounted on said support rod for adjustment axially of said rod thereof, means for securing said micrometer support head in selected adjusted position on said support rod, a plurality of micrometer support rods mounted on said head in positions corresponding to the angularly adjusted positions of said control support rod to project from the micrometer support head lengthwise of the tool path for selective alignment with the actuating element of one of said switches to reverse the tool holder on an operative stroke thereof in each of the selected angularly adjusted positions of said control support rod, a micrometer mounted on each micrometer support rod axially beyond said micrometer support head toward said switches for micrometer adjustment of the overall length of the rod and the micrometer mounted thereon, and a disk mounted coaxially on said support rod on the opposite side of said switches from said micrometer support head, said disk being positioned to engage the other of said switches on a return stroke of said tool holder.

7. A control mechanism for a machine having a fixed frame and a tool holder mounted thereon to move back and forth along a predetermined path, a pair of control switches mounted with the actuating elements thereof facing oppositely adjacent said path and fixedly secured to said frame, said switches being connected, upon actuation of each thereof, to reverse tool holder movement in opposite directions, a pair of peripherally interdigitated micrometer support heads mounted on said tool holder, means for rotatively adjusting said heads, a plurality of micrometer support rods mounted on the peripheral interdigitated portions of said heads to project therefrom lengthwise of the tool path for selective alignment upon rotation of said heads with the actuating element of one of said switches in each of a plurality of selected rotatively adjusted positions of said heads, and a micrometer mounted on each micrometer support rod axially beyond its micrometer support head toward said switches for micrometer adjustment of the overall length of the rod and the micrometer mounted thereon.

References Cited in the file of this patent

UNITED STATES PATENTS

| 971,679 | Kirby | Oct. 4, 1910 |
| 2,148,348 | Groene et al. | Feb. 21, 1939 |
| 2,310,720 | Wandrey | Feb. 9, 1943 |
| 2,483,712 | Schafer | Oct. 4, 1949 |
| 2,543,759 | Cannon et al. | Mar. 6, 1951 |
| 2,561,169 | Brickehauft | July 17, 1951 |

FOREIGN PATENTS

| 839,920 | France | Dec. 16, 1938 |